Figure 1:
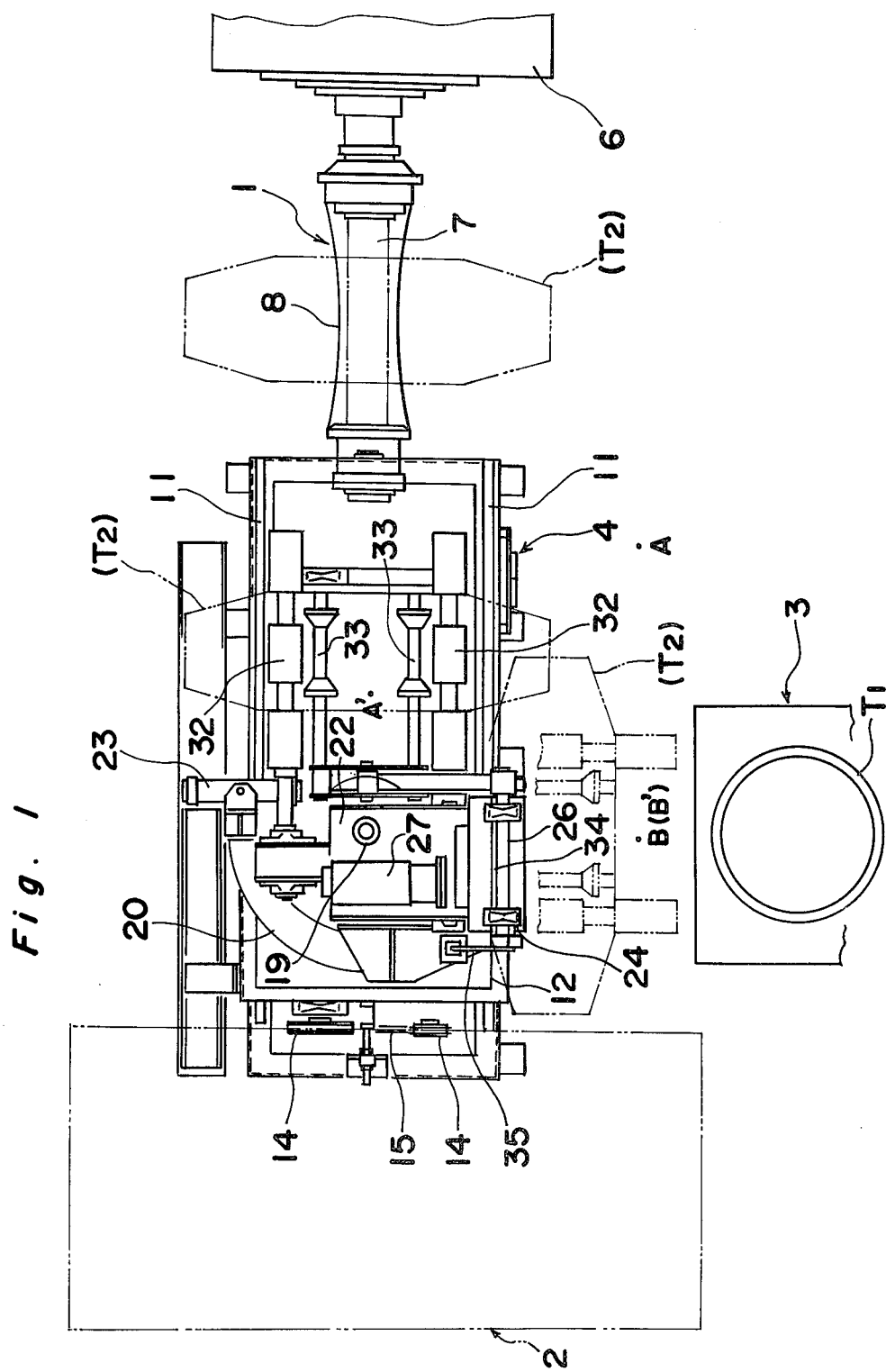

United States Patent [19]

Fujimoto et al.

[11] Patent Number: 4,462,776
[45] Date of Patent: Jul. 31, 1984

[54] TIRE WITHDRAWAL ARRANGEMENT

[75] Inventors: Mitsuru Fujimoto, Shirakawa; Hisashi Imai, Fukushima; Takashi Matumoto, Shirakawa, all of Japan

[73] Assignee: Sumitomo Rubber Industries, Ltd., Hyogo, Japan

[21] Appl. No.: 393,340

[22] Filed: Jun. 29, 1982

[30] Foreign Application Priority Data

Jun. 30, 1981 [JP] Japan .................... 56-103608

[51] Int. Cl.³ ............................................ B29H 5/02
[52] U.S. Cl. ..................................... 425/31; 156/111; 156/396; 414/428; 425/38
[58] Field of Search ................... 425/31, 38; 156/111, 156/126, 394.1, 421.2, 421.4, 421.6, 421.8, 396; 414/226, 428, 729

[56] References Cited

U.S. PATENT DOCUMENTS

| 4,039,365 | 8/1977 | Takasuga et al. .................. 156/396 |
| 4,093,495 | 6/1978 | Colombani ......................... 156/126 X |
| 4,204,903 | 5/1980 | Alexander ......................... 156/126 X |
| 4,304,619 | 12/1981 | Riggs ............................... 156/396 X |

FOREIGN PATENT DOCUMENTS 429968 4/1975 U.S.S.R. ............................ 425/38

Primary Examiner—Jan H. Silbaugh
Attorney, Agent, or Firm—Birch, Stewart, Kolasch & Birch

[57] ABSTRACT

A tire withdrawal arrangement for use in a green tire shaping process which includes a platform car arranged to be movable in a direction for withdrawing a tire from a tire shaping former, a rotating support stand provided on the platform car, and tire support arms of elevating and rocking type provided on the rotating support stand, with the tire withdrawn from the tire shaping former through the tire support arms being rotated on the rotating support stand so as to feed the tire onto a conveyor device through rocking motion of the tire support arms.

3 Claims, 3 Drawing Figures

TIRE WITHDRAWAL ARRANGEMENT

The present invention generally relates to a tire manufacturing apparatus, and more particularly, to a tire withdrawal arrangement for use in a raw tire or green tire (referred to as a green tire hereinbelow) shaping process.

Conventionally, in a green tire shaping process, it has been a general practice that green tires finished by a tire shaping former are manually withdrawn or removal from the tire former by a worker for the shaping process, and since the green tires are generally large in size and heavy in weight, not only a great deal of labor is involved, but working efficiency is undesirably lowered, with a consequent reduction in the productivity of tires.

Furthermore, manual operation by the worker has also been required for insertion of the green tires finished by a first stage former into a second stage former, thus resulting in a further reduction of working efficiency in the tire shaping process. Accordingly, an essential object of the present invention is to provide a tire withdrawal arrangement for use in a green tire shaping process, which is capable of automatically withdrawing finished green tires from a shaping former, with substantial elimination of the disadvantages inherent in the conventional arrangements of this kind.

Another important object of the present invention is to provide a tire withdrawal arrangement of the above described type, which is simple in construction and stable in functioning at high reliability, and is intended to contribute to fully automatic handling of green tires in a green tire shaping process.

In accomplishing these and other objects, according to one preferred embodiment of the present invention, there is provided a tire withdrawal arrangement for use in a green tire shaping process which comprises a platform car arranged to be movable in a direction for withdrawing a tire from a tire shaping former, a rotating support stand provided on the platform car, and tire support arms of elevating and rocking type provided on the rotating support stand, with the tire withdrawn from the tire shaping former by the tire support arms being rotated on the rotating support stand so as to feed the tire onto a conveyor means through rocking motion of the tire support arms.

By the arrangement according to the present invention as described above, an improved tire withdrawal arrangement efficient in operation has been advantageously presented through simple construction.

Figure 2:
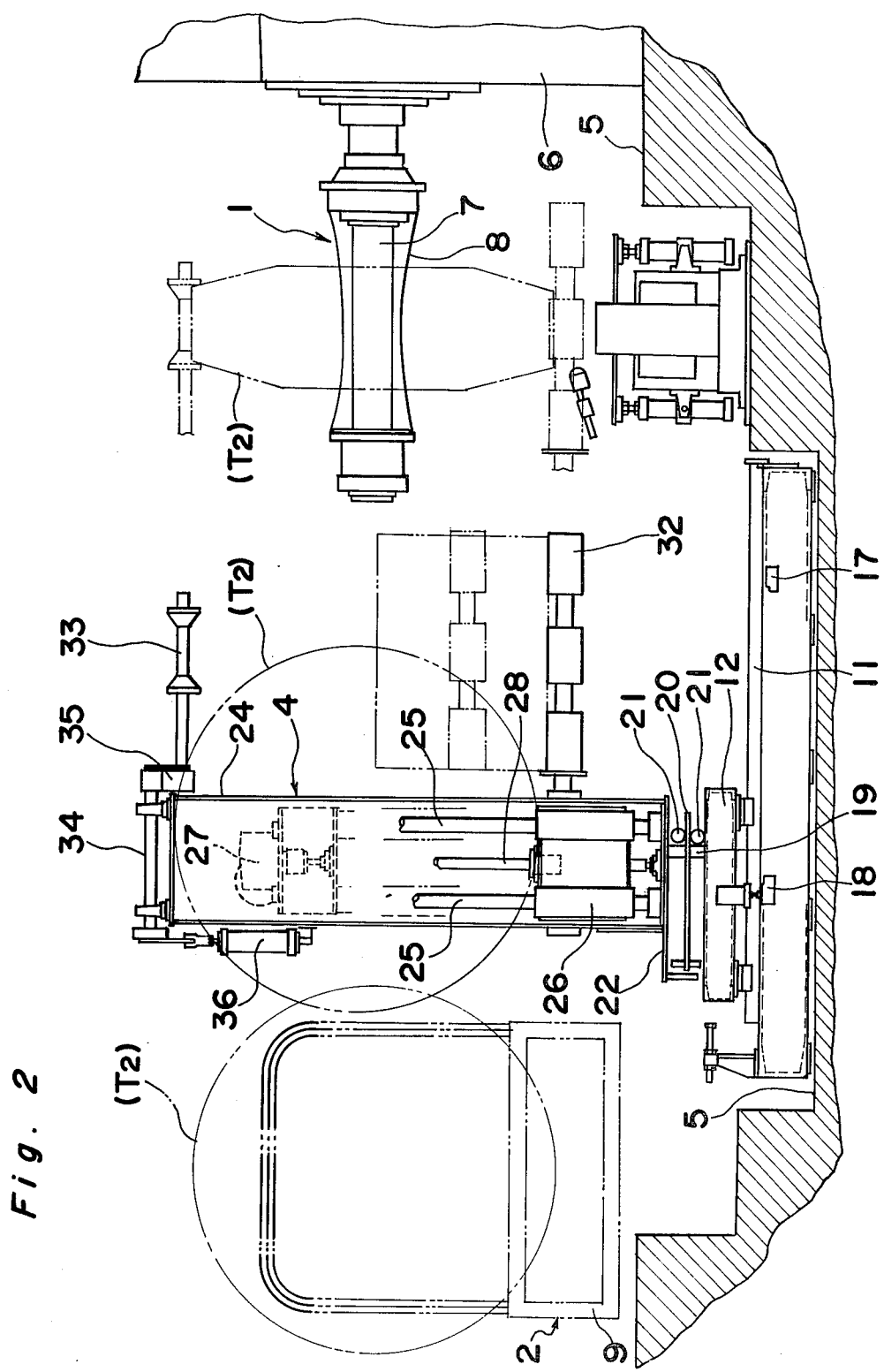
Figure 3:
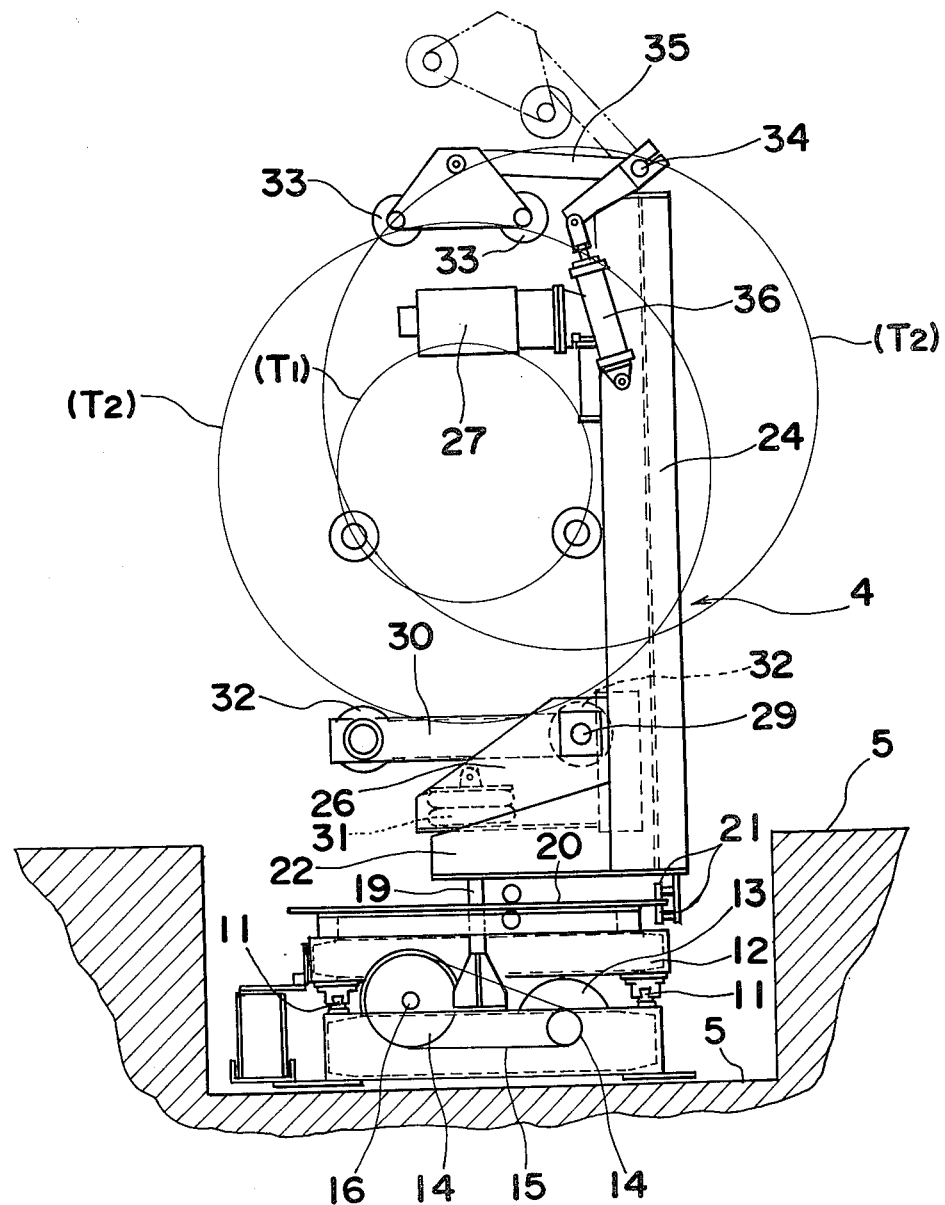

These and other objects and features of the present invention will become apparent from the following description taken in conjunction with the preferred embodiment thereof with reference to the accompanying drawings, in which;

FIG. 1 is a schematic top plan view of a tire withdrawal arrangement for use in a green tire shaping process according to one preferred embodiment of the present invention, FIG. 2 is a front elevational view of the tire withdrawal arrangement of FIG. 1, and FIG. 3 is a side elevational view of the tire withdrawal arrangement of FIG. 1.

Before the description of the present invention proceeds, it is to be noted that like parts are designated by like reference numerals throughout the accompanying drawings.

In the first place, it is to be noted that the present invention is intended to solve the problems inherent in the conventional tire withdrawal arrangements as described earlier.

According to a first part of the present invention, there is provided a tire withdrawal arrangement which generally includes a rotating support stand provided on a movable platform car, and tire support arms of elevating and rocking type mounted on the rotating support stand to constitute the tire withdrawal arrangement. By the movement of the platform car, and upward and downward movements of the tire support arms, the green tires removed from the tire shaping former by the tire support arms are rotated by the rotating support stand so as to be fed into a conveyor means through the rocking motion of the tire support arms. This arrangement contributes to a large extent to the total automation of the tire withdrawal operation.

The second part of the invention is a second sequence appropriate to the sequential tire process after the first part of the operation. With respect to the second stage shaping-former the tire conveyor rack and the platform, which supplies completed tires from the first stage former, are provided in predetermined positions. At the position of the supply platform, tires finished at the first stage are supported on the tire support arms and through the upward and downward movements of the tire support arms, movement of the platform car and rotation of the support stand, they are fed for insertion into the second stage former. Meanwhile, through movement of the platform car and the upward and downward movements of the tire support arms, tires finished at the second stage are taken out from the second stage former, turned at the rotating support stand and, by the rocking motion of the tire support arms, are fed onto the conveyor rack. The above arrangement also constibutes to full automation of the withdrawal operation of tires finished at the second stage shaping and supply of tires which have finished at the first stage.

Referring now to the drawings, there is shown in FIGS. 1 to 3, a tire withdrawal arrangement according to one preferred embodiment of the present invention.

As shown in FIG. 1, the tire withdrawal arrangement 4 is disposed to be surrounded by a second stage former 1 disposed at the right side in the direction of tire insertion and withdrawal, a tire conveyor rack 2 disposed at the left side, and a supply platform 3 of tires finished by the first stage provided at a side portion (i.e. at a lower portion in FIG. 1).

The second stage tire former 1 described above has a rubber former 8 with a freely contracting or expanding circumference, supported by a former spindle 7 on a machine platform 6 which is spaced on a floor 5, and is intended to form the tube-like tire T1 finished at the first stage into the tire T2 finished at the second shaping.

The tire conveyor rack 2 is equipped with a moving rack platform car 9 movable on the floor 5 in a direction intersecting at right angles with the direction in which tires are fed in and taken out, while vertically supporting tires completed for the second stage and fed onto the rack platform car 9 for intermittent movement.

The supply platform 3 referred to above stacks horizontally and stores the tires T1 completed for the first stage through shaping by the first shaping former (not shown).

The tire withdrawal arrangement 4 mentioned above is equipped with a platform car 12 which moves in the direction of the tire insertion and withdrawal on rails 11 and 11 laid on the floor 5, between the tire conveyor rack 2 and the second stage former 1. The platform car 12 is driven by a screw shaft 16 connected to a motor 13 through pulleys 14 and 14 and a belt 15, and is controlled for movement and stopping by actuating limit switches 17 and 18 provided at an inserting and withdrawal position A confronting the second shaping former 1 and at a carry-in and carry-out position B confronting the tire conveyor rack 2 and the supply platform 3.

On the platform car 12 mentioned above, a rotating support stand 22 is provided for rotation about a rotary shaft 19 so as to be guided by wheels 21 and 21 holding a rotary rail 20 in a disc-like configuration therebetween, between a front position A' where tire support arms 32 and 32 confront the second shaping former 1 and a lateral position B' where said arms 32 and 32 face the supply platform 3. The rotating support stand 22 is controlled for its rotation between the front position A' and the lateral position B' by the functioning of a revolving hydraulic cylinder 23.

On the rotating support stand 22, a vertical support column 24 is installed upright. A pair of guide shafts 25 and 25 for this vertical support column 24 are installed to guide an elevating platform 26 for upward and downward movements. This elevating platform 26 is controlled for its movement between a lowered position and a raised position by a screw shaft 28 driven by a motor 27. On this elevating platform 26, a rocking platform 30 supported by a rocking spindle 29 for rocking motion is provided. The rocking platform 30 is controlled for the rocking motion between a level position and a rocking position by the expansion and contraction of an air mat 31 provided with respect to the elevating platform 26.

To the rocking platform 30, the pair of tire support arms 32 and 32 are fixed at predetermined intervals, for supporting therebetween either the tire T1 completed for the first stage of shaping or the tire T2 completed for the second stage of shaping.

On the upper part of vertical support column 24, tire pressing rollers 33 and 33 extended in the same direction as the tire support arms 32 and 32, and fixed to a rocking arm 35 supported for rocking motion by a rocking shaft 34, are provided. The tire pressing rollers 33 and 33 for the rocking arm 35 are controlled for the rocking motion between a position for holding, from above, the tire T2 finished for the second stage shaping and supported at the lower portion by the tire support arms 32 and 32, and another position for retreating upward by the action of a rocking hydraulic cylinder 36.

When the tire withdrawal arrangement is constructed in the manner as described above, the platform car 12 is first stopped at the carry-in and carry-out position B, and the rotating support stand 22 is positioned at the laterally directed position B'.

When the worker takes the tire T1 completed from the first stage shaping from the supply platform 3, and stacks up the tire vertically between the tire support arms 32 and 32, and turns ON a foot switch (not shown), the rotating support stand 22 turns to the position A' pointing forward through the action of the rotating hydraulic cylinder 23, while the elevating platform 26 rises through the drive of a motor 27 at the same time, and stops rising at a position where the center of the tire T1 finished for the first shaping is aligned with the center of the second shaping former 1.

At the same time, the platform car 12 moves to the insertion and withdrawal position A through the drive of the motor 13 and stops. At this time, the tire T1 finished from the first stage shaping has been inserted into the rubber former 8.

The tire T1 completed from the first stage shaping is supported on the second stage former 1 by the expansion of the rubber former 8, and subsequently, the platform car 12 moves as far as the carry-in and carry-out position B through the drive of the motor 13 and stops, and the elevating platform 26 is lowered by the drive of the motor 27 and stops.

After completion of the second stage shaping of the tire T1, upon turning ON of the foot switch by the worker, the platform car 12 moves to the insertion and withdrawal position A through the drive by the motor 13 so as to be stopped thereat. The elevating platform 26 moves up through the drive of the motor 27 for supporting the tire T2 completed from the second stage shaping from below, while the tire pressing rollers 33 rock through the action of a rocking hydraulic cylinder 36 and support and press down on the tire T2 completed from the second stage shaping from above. After that, the rubber former 8 contracts.

Subsequently, the platform car 12 rocks to the carry-in and carry-out position B through the drive of the motor 13 and halts. The rotating support stand 22 turns to the rotation position B' through the action of turning hydraulic cylinder 23 and stops. After the tire pressing rollers 33 have rocked to the retreated position through the functioning of the rocking hydraulic cylinder 36, upon turning ON of the foot switch by the worker, air is supplied into the air mount 31 for expansion, and the rocking platform 30 and rocking tire support arms 32 and 32 are subjected to the rocking motion, and thus, the tire T2 completed from the second stage shaping, is turned over and discharged so as to be fed onto the tire conveyor rack 2. The tire conveyor rack 2 is moved intermittently before the subsequent tire T2 completed from the second stage shaping is fed in. Then, the air mount 31 is contacted, and the rocking platform 30 is returned to the horizontal position so as to revert to the original position.

Through the above functions, the process of feeding in and taking out the tires T1 and T2 is continuously repeated.

In the embodiment described so far, although it is so arranged that the worker raises the tires T1 completed from the first stage shaping, and actuates the foot switch, it is also possible to fully automate the process through introduction of a raising mechanism, and a sequence control device, etc. depending on the necessity.

As is clear from the foregoing description, the first part of the present invention is one in which the elevating and rocking type support arms are provided on the rotating support stand on the platform car, and therefore, it is possible to withdraw the tires finished from shaping by the tire shaping former by the tire support arms, change the direction by the rotation of the support stand, and feed them into the conveyor means by the rocking of the tire support arms.

Accordingly, not only labor saving is achieved, but productivity is also promoted, thus contributing a large extent to automation of the tire withdrawal operation.

Meanwhile, in the second part of the present invention, with respect to the second stage former, the tire conveyor rack and the platform which supplies completed tires from the first stage former, are provided in predetermined portions. At the position of the supply platform, tires finished for the first stage are supported on the tire support arm and through the upward and downward movements of the tire support arms, movement of the platform car and revolution of the support stand, they are fed for insertion into the second stage former. Meanwhile, through movement of the platform car and the upward and downward movements of the tire support arms, tires completed from the second stage are taken from the second stage former, turned at the rotating support stand and by the rocking motion of the tire support arms, fed onto the tire conveyor rack. By the above arrangement, labor saving may be achieved in the similar manner as in the first part of the invention for contribution to automation of the tire supplying and withdrawal operation.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A tire withdrawal and transfer configuration for at least one tire shaping-former which comprises in combination:

a platform car for conveying said tire;

a rotatable support means provided on said platform car;

means for withdrawing said tire from said tire shaping-former mounted on said rotatable support means, said withdrawing means comprising tire support arms, including elevation means and rocking means, movable upward and downward with respect to said platform car;

means for actuating said elevation means of said withdrawal means so as to raise and lower said tire support arms so as to remove said tire from said tire shaping-former;

means for actuating said rotatable support means for positioning said tire for delivery via said platform car to a second tire shaping-former or a conveyor means; and means for actuating said rocking means for delivery of said tire to said conveyor means through a rocking motion of said tire support arms.

2. The tire withdrawal and transfer configuration of claim 1 wherein said withdrawing means further includes means for holding said tire from above.

3. A tire withdrawal and transfer configuration of claim 1 which includes at least two tire shaping-formers wherein said tire transfer configuration is provided for transferring a first formed tire from a tire supply platform to a second tire shaping-former and for withdrawing said tire from said second tire shaping-former to be fed to said tire conveyor.

* * * * *